Oct. 31, 1939.　　　M. A. L. PERREY　　　2,177,876
KINETIC ENERGY INDICATOR FOR IMPACT TESTING APPARATUS
Filed May 24, 1937　　　4 Sheets-Sheet 1
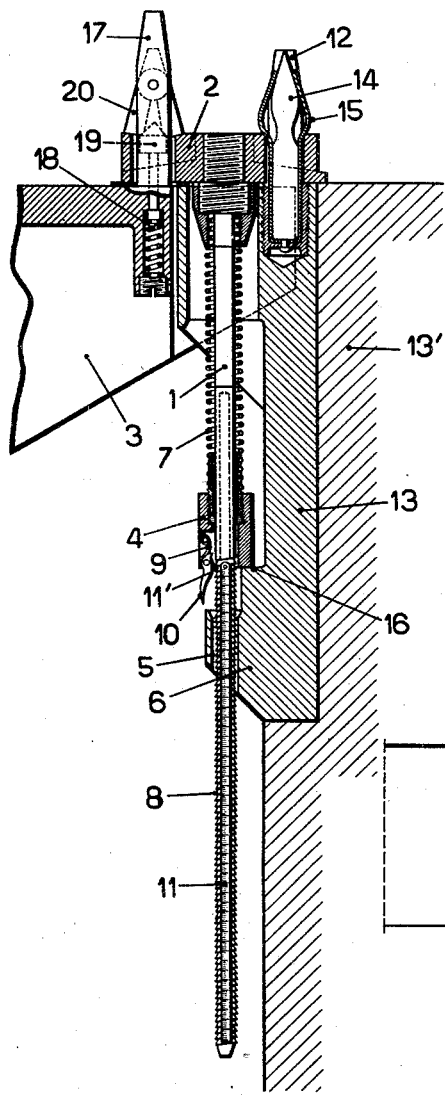
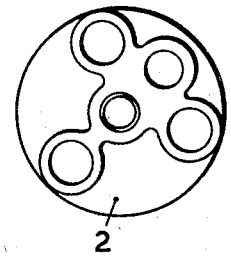
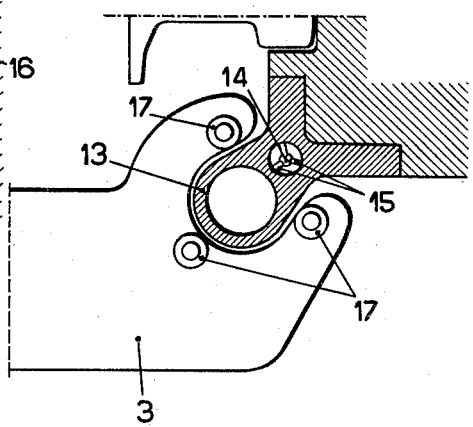

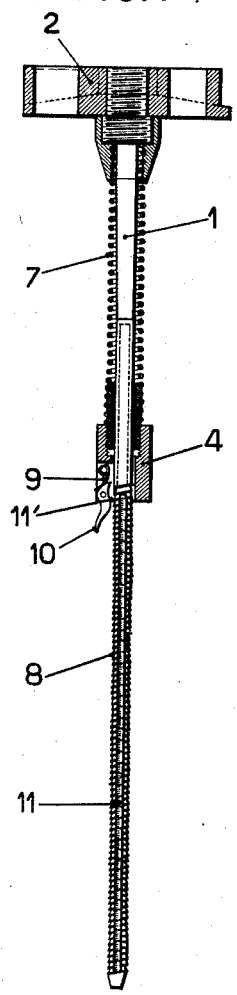
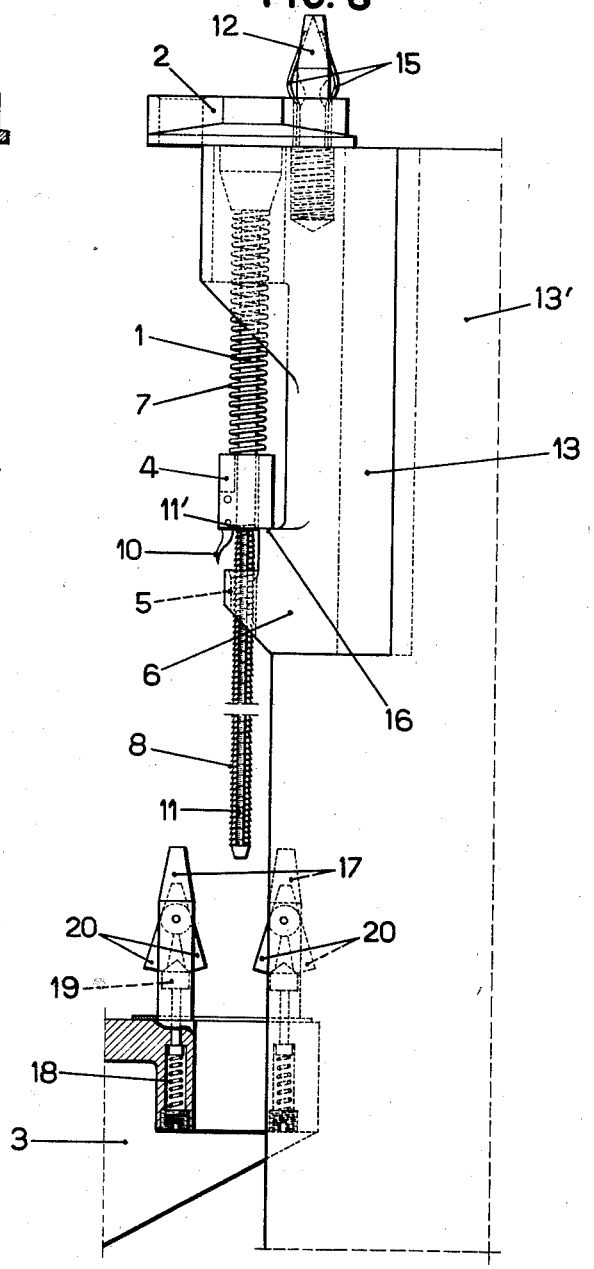

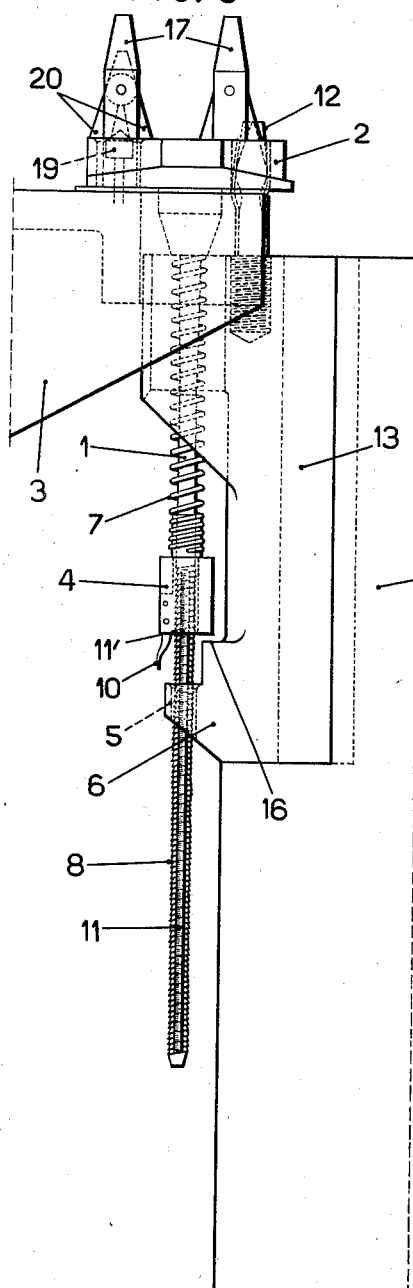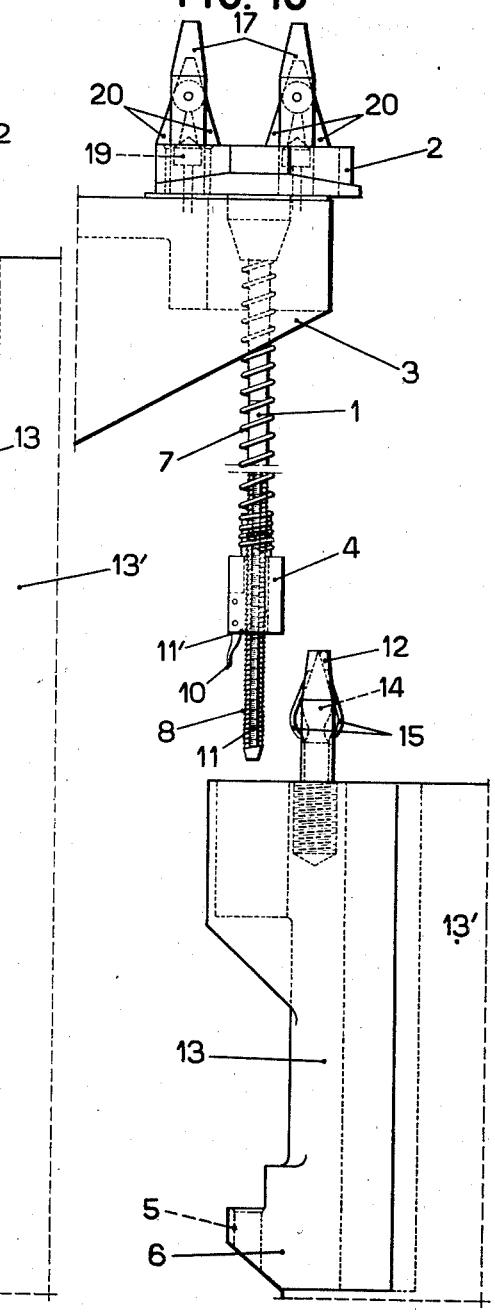

Patented Oct. 31, 1939

2,177,876

UNITED STATES PATENT OFFICE 2,177,876

KINETIC ENERGY INDICATOR FOR IMPACT TESTING APPARATUS

Marcel Augustin Léon Perrey, Herserange, France, assignor to Société Anonyme des Hauts-Fourneaux de la Chiers, Longwy (Meurthe et Moselle), France Application May 24, 1937, Serial No. 144,530
In France April 1, 1937

6 Claims. (Cl. 265—13)

In his copending United States patent application Serial No. 86,012, of June 18, 1936, for "Process and apparatus for the measurement of the work of an impact member moving at a high speed", the applicant has described a process which consists in substituting, for the direct measurement of the work of the impact member itself, the measurement of the work of an inertia member carried by said impact member, having the same speed as the latter before impact and compressing (or stretching) by inertia, at the time of impact, a calibrated spring; in accordance with said process, the work to be measured was easily deducted from the work of the spring compressed (or stretched) by the displacement of the inertia member.

The apparatus for carrying out the process which has just been mentioned was constituted by the combination: of a guide device rendered rigid with the impact member,—of an inertia member capable of freely moving in the device,— of a calibrated precision spring compressed (or stretched) by the inertia of the unit composed of the inertia member and of a spring,—and, finally, of a device for recording the displacement of this inertia member.

Experience has shown that, in the application to the particular case of the measurement of the work absorbed by the breaking of a rail by means of a drop-hammer, the apparatus and process above mentioned gave, in some cases, and for reasons such as yielding or distortion of the article to be broken, noninstantaneousness of the breaking, etc., inaccurate measurements.

The apparatus forming the subject matter of the present invention allows of remedying this inconvenience.

In accordance with the new invention, the work of breaking a rail or other similar member will be determined by starting, not from indications read on the recording apparatus at the moment of the breaking itself, but from those given by an indicating apparatus subsequently to said breaking and precisely at a moment the drop-hammer occupies a particular and well defined position. At this precise moment, the apparatus will be released from the drop-hammer and will strike upon an incompressible base or stand and will lock itself on the latter.

In other words, the operation of the apparatus forming the subject-matter of the invention consists in accurately determining the residual kinetic energy of the drop-hammer at a moment when the latter occupies a known position after breaking of the rail, and it is from this residual kinetic energy that the work of breaking the rail will be deducted with accuracy by an indirect calculation.

The apparatus for carrying out the new invention is essentially constituted by the combination, with the elements already utilised in the prior apparatus above mentioned (that is to say the guide device, inertia member, calibrated spring and indicating device):

(a) Of a resilient device for locking the apparatus on the drop-hammer (before impact of this apparatus upon a suitable base or stand) and for unlocking it after this impact;

(b) Of a device adapted to lock the unit composed of the inertia member and of the spring before impact and in subsequently unlocking it; and finally (c) Of a device for locking the apparatus on its impact base or stand and thus preventing it from rebounding.

The necessity of these additional devices clearly appears from the special conditions of operation of the new apparatus, a short description of which will be given hereinafter.

The drop-hammer freely falls from a known height; it breaks the rail and continues its downward movement without touching the supporting members until the very moment its residual kinetic energy will be measured. Assuming a nearly perfect guide device rendering friction negligible and a system of supporting members such that the latter cannot move during breaking, the difference between the kinetic energy which the drop-hammer would acquire at the level under consideration if this drop-hammer did not break the rail and the residual kinetic energy measured at the same level when it breaks a rail, represents the work for breaking the latter. This being set forth, the apparatus forming the subject-matter of the invention satisfies the following conditions of operation:

In the first place, it must be provided with a suitable device holding it rigid with the drop-hammer before, during and after breaking of the rail up to the moment the drop-hammer occupies the position chosen for the measurement of the residual kinetic energy. During this time, the unit composed of the inertia member and of the spring is locked.

In the second place, at the precise moment which has just been mentioned, the apparatus is released from the drop-hammer and strikes upon an immovable base or stand of any suitable shape; at the same moment, the inertia-member spring unit is automatically unlocked by the drop-hammer which continues to freely fall.

In the third place and also at the same moment, an automatic locking device locks the apparatus on its base or stand and prevents it from rebounding.

In these conditions, the indication given by the apparatus allows of determining the kinetic energy of the latter and, consequently, the kinetic energy of the drop-hammer which has the same speed as the apparatus at the time of impact under consideration.

A form carrying out the invention is illustrated, by way of example only, in the accompanying drawings, in which:

Fig. 1 is a sectional view made through a median vertical plane of the apparatus constructed according to the invention.

Fig. 2 is a plan view of the head of the apparatus.

Fig. 3 is a plan view of the impact base or stand.

Figure 7 is a cross sectional view of the residual kinetic energy measuring means.

Figure 8 is an elevational view of the apparatus before the head 2 contacts the impact base.

Figure 9 is a similar view showing the parts at the moment of impact; and

Figure 10 is a similar view after the head 2 has come into contact with the impact base 3 and the drop-hammer has passed beyond the impact base and the kinetic energy measuring means have been separated from the drop-hammer.

Figure 4:
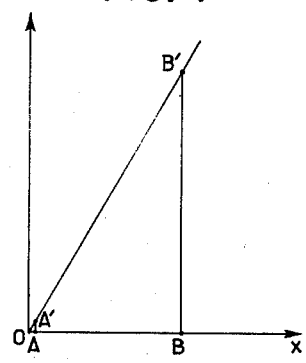
Fig. 4 is a diagram of the stretching of the calibrated spring.

In the particular case which will be considered, the number T of kilogram-meters absorbed by the breaking of the rail resting on two bearing or supporting members is to be measured, which breaking is caused by the fall of a drop-hammer, of known weight, freely falling from a height also known.

As shown in the drawings, the apparatus which allows, according to the invention, of determining T, by an indirect method, comprises the following elements:

1.—A guide device constituted, in the embodiment illustrated, by a hollow cylindrical rod 1 secured and centered on the head 2 of the apparatus as by screw threads. This head constitutes both the member for locking the apparatus on the drop-hammer and the member striking upon the base or stand 3. The rod 1 slides in a cylindrical hole bored in the axis of an inertia member 4, and in a vertical cylindrical cavity 5 which is provded in a bracket 6 for securing the apparatus on the drop-hammer;

2.—A cylindrical inertia member 4 having the same axis as the guide rod 1;

3.—A precision spring 7 previously calibrated and welded by its lower turns to the inertia member 4 and secured at its upper turns in any desired manner to the head 2;

4.—A device for indicating the displacement of the inertia member: in the embodiment illustrated by way of example, the rod 1 is provided, in the zone of displacement of the inertia member, with a helical screw thread 8 of suitable pitch and profile. Two leaf springs 9, 9 press upon two pawls 10, 10 and engage them with the screw threads. In these conditions, the inertia member can move down, but it cannot rise. A vertical graduated bar 11 allows of reading the displacements of the inertia member by means of a horizontal reference line 11' traced on the inertia member. In operation, the inertia member hung from the spring acts simply by its weight and the reference line is opposite the zero of the graduated bar. After each test, the pawl is released by hand and the inertia member is restored to position of operation;

5.—A device for holding the apparatus locked on the drop-hammer before, during and after breaking of the rail until the apparatus strikes upon its base or stand; this device also allows of unlocking the apparatus at the moment of impact.

In the embodiment illustrated, this device is constituted:

(a) By the head 2 of the apparatus which rests on the bracket for securing the apparatus on the drop-hammer (which bracket is of cylindrical shape);

(b) By the resilient locking member 12;

(c) By the impact base or stand 3, the upper part of which, in the shape of a horseshoe, receives the impact of the apparatus and stops it in its fall whilst allowing the bracket 13 rigid with the drop-hammer to pass between its branches. The resilient locking member 12 is provided on the drop-hammer with a pin 14 and with bent springs 15 of suitable power and shape. This locking member is adapted to ensure up to the moment the apparatus strikes upon its base or stand a sufficient locking action for holding it rigid with the drop-hammer and for neutralizing in particular the rebounding stress when the rail is broken. After impact of the apparatus on its base or stand 3, the drop-hammer, when it falls, carries along with it the pin 14 and the springs 15 which bear with an increased force in the housing of the locking member and firmly press the head of the apparatus on the base or stand 3. Immediately after, the locking member moves out from its housing in the head of the apparatus, which is thus released.

6.—A device for locking the inertia member-spring unit up to the moment of impact and for unlocking it at the same moment. For that purpose, use is made, according to the invention, of a spring the turns of which are in contact together, and the drop-hammer is provided with an abutment 16 adapted to prevent the inertia member from moving down up to the moment of impact of the apparatus. When the drop-hammer moves down, the abutment 16 automatically releases the inertia member-spring unit, the elongation of the spring of said unit corresponding to the residual speed to be measured.

7.—Finally, a device for locking the head 2 of the apparatus on its impact base or stand 3 and for preventing it from rebounding; this device is constituted by three locking members 17 on the impact base which, slightly before impact, enter their respective cylindrical housings provided in the head of the apparatus. Springs 18 move apart, through the medium of wedges 19, the branches 20 of said locking members which, upon impact, lock the apparatus on the base or stand.

Calculation of the apparatus

As previously indicated, the apparatus forming the subject-matter of the invention is adapted to be used in the case of an instantaneous and sudden stoppage, i. e., at the time impact of the head of the apparatus takes place on the base or stand adapted to receive said head. The calculation will be done for this particular case. It will be assumed that the apparatus strikes upon its base or stand after a free fall $h$ of the drop-hammer.

Let—
A=initial position of the reference line of the inertia member.
B=lowest position of said reference line by stretching of the spring.
AB=$x$ (in meters).
$p$=weight (in kilograms) of the completely equipped inertia member and of the turns attaching the inertia member to the spring.
$p'$=weight (in kilograms) of the useful turns of the spring.
$f$=sag (in meters) of the spring per kilogram of load.

It will be written that the work supplied by gravity to the inertia member-spring unit is equal to the work of the spring, that is to say to the area of the trapezium ABB'A' (Fig. 4).

One has:

$$h(p+p') + x\left(p + \frac{p'}{2}\right) = \text{area } ABB'A' = (\overline{AA'} + \overline{BB'})\frac{x}{2}$$

Now:

$$\overline{AA'} = p + \frac{p'}{2}$$

$$\overline{BB'} = \frac{\overline{OB}}{f} = \frac{\overline{OA}+x}{f} = \frac{\overline{OA}}{f} + \frac{x}{f}$$

But:

$$\frac{\overline{OA}}{f} = \overline{AA'} = p + \frac{p'}{2}$$

Therefore:

$$\overline{AA'} + \overline{BB'} = 2p + p' + \frac{x}{f}$$

One has:

$$h(p+p') + x\left(p + \frac{p'}{2}\right) = x\left(p + \frac{p'}{2} + \frac{x}{2f}\right)$$

or $$x^2 = 2fh(p+p')$$

The equation of a parabola plotted to its axes will therefore be obtained, which equation gives $x$ in function of $h$. Reversely, from $x$, given by the apparatus, will be deducted the height of fall $h$ which would have imparted the same speed to the drop-hammer, or, in other words, its kinetic energy at the time of impact of the apparatus on its base or stand.

Figure 5:
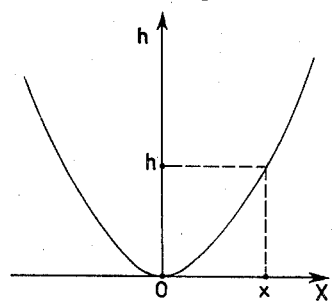
Fig. 5 is a curve approximating a parabola and indicating the relation between the height of fall of the drop-hammer and the stretching of the spring.

In practice, the relation between the height of fall and the elongation of the spring will not rigorously verify this parabolic law, but this relation can always be determined experimentally. A calibration curve approximating a parabola will be obtained, and this curve, $x$ being known, will give $h$. (Fig. 5.)

Figure 6:
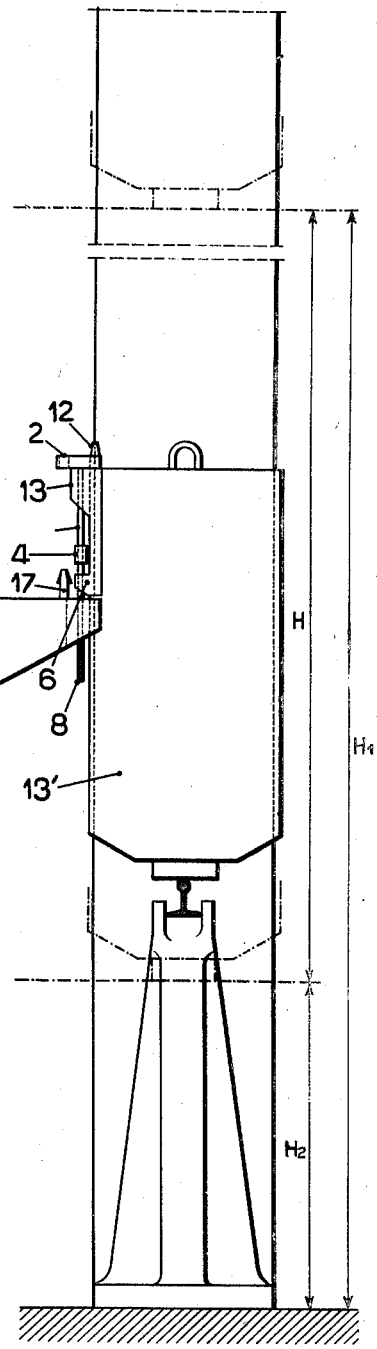
Fig. 6 is an explanatory diagram indicating the initial altitude $H_1$ of the drop-hammer above the anvil-block and its altitude $H_2$ at the time the residual kinetic energy (impact of the apparatus on its base or stand) of the drop-hammer is being measured.

This being set down, the method employed is the following:

The drop-hammer, of known weight P, is caused to fall from an initial altitude $H^1$ above the anvil-block (Fig. 6).

The drop-hammer and the bearing or supporting members are arranged in such a manner that the drop-hammer, after it has broken the rail, continues its displacement without touching the bearing or supporting members until the apparatus strikes upon its base or stand (Fig. 6). Let $H^2$ be the altitude of the drop-hammer above the anvil-block at this moment of impact.

When the apparatus strikes upon its base or stand, the spring lengthens to an extent $x$; to this lengthening corresponds a residual speed $v$ of the drop-hammer (or of the apparatus) which would be that imparted to the drop-hammer by freely falling from a height $h$ corresponding to $x$ on the calibration curve (Fig. 4).

The residual speed $v$ of the drop-hammer at the level $H^2$ is given by:

$$v^2 = 2gh$$

When freely falling (without interposition of the rail to be broken) the speed V of the drop-hammer would be at this same level $H^2$:

$$V^2 = 2g(H1-H2) = 2gH$$

Consequently, the work T for breaking the rail is:

$$T = \frac{1}{2}M(V^2 - v^2) = Mg(H-h) = P(H-h)$$

Now, $h$ can be deducted from the calibration curve by $x$ being known, and the desired value of T will be determined. The method which has just been set forth is applicable to the measurement of the work for breaking any article, even when this article has been subjected to important distortions.

It is to be understood that the invention is not limited to the embodiment which has been described and illustrated and that various modifications can be made in the details of construction of the apparatus without departing from the scope of the invention. Thus, for instance, the apparatus might be provided with a compression spring and that a different indicating or recording device might be adopted. The various locking devices illustrated in the drawings might also be replaced by devices of different construction.

In the embodiment which has just been described and illustrated, the apparatus indicates the residual kinetic energy of the impact member by determination of the speed of the apparatus at the time of impact on a suitable base or stand.

The invention also provides a modification of the apparatus in which the residual speed is measured at the moment of impact of the impact member (and of the apparatus which is rigid therewith) on the anvil-block of the drop-hammer.

In this latter embodiment, the inertia member-spring unit is constantly locked in the apparatus, except immediately before impact when it is unlocked by a suitable unlocking device.

The advantages of the apparatus which has just been described and illustrated are obvious. In fact, by avoiding rebounding of the apparatus after impact, the perturbations which said rebounding might produce in the tracing of the calibration curve can be eliminated. Moreover, the utilisation of apparatus and of impact bases or stands of standardized construction combined with that of perfectly guided drop-hammers give, in fact, a calibration curve capable of being used in all cases whatever may be the conditions of the ground and the like at the places where the measurement of the breaking work is effected.

On the other hand, the locking and unlocking in due time of the inertia member-spring unit are effected in a particularly simple and automatic manner.

This form of my invention allows moreover of braking the drop-hammer near the end of its displacement and before it strikes on the anvil-block, this avoiding the destructive effects which might be feared in case of direct, violent and repeated impacts on the anvil-block. Such a braking action can be effected for instance by the arrangement of the bearing or supporting members themselves by giving to the inner walls of these latter members (walls between which the drop-hammer wedges at the end of its displacement) a suitable shape.

What I claim as my invention and desire to secure by Letters Patent is:

1. An apparatus for determining the kinetic energy required to rupture a body comprising a vertically moving mass for rupturing said body, an auxiliary movable mass mounted on said mass so as to be vertically inmovable relative thereto, means for removing said auxiliary mass from said moving mass after the rupture of said body and means cooperating with said auxiliary mass for determining the kinetic energy of said auxiliary mass.

2. An apparatus for determining the kinetic energy required to rupture a body comprising a moving mass for rupturing said body, an auxiliary mass mounted on said mass, a calibrated spring associated with said auxiliary mass, means for displacing said auxiliary mass and said spring from said moving mass after the rupture of said body and means for arresting the displacement of said auxiliary mass whereby a direct reading of the kinetic energy of said auxiliary mass at such point is obtained on said spring.

3. An apparatus for determining the kinetic energy required to rupture a body comprising a drop hammer, an inertia member removably mounted on said hammer, a guide for said inertia member, a calibrated precision spring attached to said inertia member and encircling said guide, means indicating the displacement of said inertia member, an impact base, a head on said guide cooperating with said impact base and means on said base for receiving said head, inertia member, guide and spring from said hammer.

4. An apparatus for determining the kinetic energy required to rupture a body comprising a drop hammer, removably mounted means on said hammer, kinetic energy measuring means carried by said means, an impact base, means for receiving said removably mounted means on said base from said hammer and means on said base for preventing rebound of said removably mounted means.

5. An apparatus for determining the kinetic energy required to rupture a body comprising a drop hammer, removably mounted means on said hammer, kinetic energy measuring means carried by said means, an impact base, and means for receiving and locking said removably mounted means on said base so as to prevent rebound thereof.

6. An apparatus for determining the kinetic energy required to rupture a body comprising a drop hammer, removably mounted means on said hammer, kinetic energy measuring means carried by said means, an impact base, and spring actuated claws for receiving and locking said removably mounted means on said base so as to prevent rebound of said removably mounted means.

MARCEL AUGUSTIN LÉON PERREY.